United States Patent [19]

Fukuta

[11] Patent Number: 4,522,078
[45] Date of Patent: Jun. 11, 1985

[54] DEVICE FOR ADJUSTING HEIGHT OF CUSHION IN REAR PART OF SEAT

[75] Inventor: Kinsho Fukuta, Toyota, Japan

[73] Assignee: Toyota Jidosha Kabushiki Kaisha, Toyota, Japan

[21] Appl. No.: 467,662

[22] Filed: Feb. 18, 1983

[30] Foreign Application Priority Data

Mar. 19, 1982 [JP] Japan .............................. 57-39160[U]

[51] Int. Cl.³ ............................................. F16H 27/02
[52] U.S. Cl. .................................... 74/89.15; 248/397
[58] Field of Search ...................... 248/371, 372.1, 394, 248/397, 157, 421, 422, 635; 297/325, 345, 354; 296/65 R; 74/409, 89.15; 308/3 R, 4 R, 220, 222

[56] References Cited

U.S. PATENT DOCUMENTS

| 604,896 | 5/1898 | Garnett | 403/149 |
| 2,173,660 | 9/1939 | Perkins | 74/409 |
| 2,178,401 | 10/1939 | Meyerhoefer | 248/635 |

FOREIGN PATENT DOCUMENTS 2306478  8/1974  Fed. Rep. of Germany ...... 248/394

Primary Examiner—William H. Schultz
Assistant Examiner—Robert A. Olson
Attorney, Agent, or Firm—Oblon, Fisher, Spivak, McClelland & Maier

[57] ABSTRACT

A device for adjusting the height of a cushion in the rear part of a seat, which has a movable element engaged with the threaded part of a rod, a link rockably mounted at a stationary member, pivotally secured at one end thereof to the element and pivotablly secured at a second end thereof to the rear part of the seat, a bearing section formed at the stationary member for bearing the end portion of the rod, a first stationary ring mounted on an end portion of the rod at a position corresponding to a first end of the bearing section, a first synthetic resin ring having large friction reducing effect interposed between and in contact with a first end of the bearing section and the stationary ring, and a second synthetic resin ring and a cushion material ring in a compressed manner interposed between and in contact with a second end of the bearing section and a second stationary ring mounted on a portion of the rod at a position corresponding to the second end of the bearing section. Thus, the operability of the thread mechanism for steplessly adjusting the height of the rear art of the seat cushion can be remarkably improved.

18 Claims, 4 Drawing Figures

DEVICE FOR ADJUSTING HEIGHT OF CUSHION IN REAR PART OF SEAT

BACKGROUND OF THE INVENTION

1. Field of the Invention

This invention relates to a device for adjusting the height of a cushion in the rear part of the seat such as a seat cushion mainly for a vehicle and, more particularly, to an improvement in a device for adjusting the height of a cushion in the rear part of the seat of an automotive seat.

2. Description of the Prior Art

In a conventional device for adjusting the height of a seat cushion of a seat for a vehicle, a rod 1 is, as shown in FIGS. 1 and 2, disposed from the front part to the rear part of the seat, the rod 1 is rotatably supported to a stationary member 4, to which the seat is pivotally secured, such as an upper raised portion of a seat track through a front bracket 2 and a link 3, a movable element 6 is engaged with the threaded part 5 formed on the rear end of the rod 1, and the link 3 and a supporting bar 7 are rotatably secured to the movable element 6.

On the other hand, to a rear bracket 8 fixed to the stationary member 4 is rotatably supported a shaft 9, the link 3 is fixed substantially at the central part to the shaft 9, and the bar 7 is also fixed to the shaft 9.

The link 3 is formed substantially in an L shape, is rotatably secured at its one end to the movable element 6 and is rotatably secured at the other end to a frame 10 at the rear part of the seat via a pin 11. Therefore, when the rod 1 is rotated forwardly or reversely by a handle H, the element 6 which is restricted in rotation by the link 3 and the bar 7 is moved under the guidance of the threaded part 5 in a direction designated by an arrow A or B.

Movement of the movable element 6 in a direction designated by the arrow A causes the pin 11 portion of the link 3 to rock in a direction designated by an arrow C, and the rear part of the seat cushion is accordingly raised through the frame 10. The movement of the element 6 in a direction designated by the arrow B, on the other hand, causes the pin 11 portion of the link 3 to rock in a direction designated by an arrow D, and the rear part of the seat cushion is consequently lowered through the frame 10. In this arrangement, stoppers 12 and 13 are defined to respectively specify the moving unit of the element 6 in the directions denoted by the arrows A and B.

With the above-described structure, the rear part of the seat cushion can be elevationally adjusted in the height. However, a large force is not only required to move the movable element 6 by rotating the rod 1 and hence by rotating the threaded part 5 of the rod 1 merely with this structure, but the seat cushion is fluctuated due to the displacement of the rod 1 caused by the backlash of the threaded part 5 of the rod 1 when an occupant sits on the seat cushion, thereby causing a drawback of a deterioration in the occupant's sitting feeling on the seat cushion.

SUMMARY OF THE INVENTION

Therefore, an object of this invention is to provide a device for adjusting the height of a seat cushion in the rear part of a seat in which a threaded mechanism for steplessly adjusting the height of the rear part of the seat cushion can be significantly easily operated.

Another object of this invention is to provide a device for adjusting the height of a seat cushion in the rear part of a seat in which the fluctuation of the seat cushion during occupant's time while seated can be reduced to improve the occupant's sitting sensation on the seat cushion by interposing a cushion material ring between the end of a rod for rotating the threaded part of the rod and a bearing section for bearing the rod, thereby absorbing and eliminating an axial gap or play between the rod and the threaded part.

Still another object of this invention is to provide a device for adjusting the height of a seat cushion in the rear part of a seat in which the frictional resistance between the bearing section and the end of the rod relatively rotating from each other can be remarkably reduced by the arrangement that the end of the rod for rotating the threaded part is contacted with the bearing part of a stationary member through a synthetic resin ring having a large friction reducing effect such as nylon or the like.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

An embodiment of the present invention will now be described in more detail with reference to the accompanying drawings.

In the present invention, the end portion 14 of the rod 1 described above is supported via an arrangement which will be described below in the structure of the device for adjusting the height of a seat cushion in the rear part of a seat as described above with reference to FIGS. 1 and 2.

Figure 4:
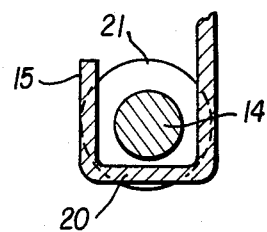
FIG. 4 is a cross-sectional view taken along line IV—IV in FIG. 3.

A bearing section 15 of U shape in section opened upwardly is, as best shown in FIG. 4, protruded from the rear bracket 8, and supports the end portion 14 of the rod 1.

A flanged stationary ring 17 is mounted on the end portion 14 corresponding to one end 16 of the bearing section 15 in the rod 1. A metal ring 18 is engaged to one end 16 of the bearing section 15. A synthetic resin ring 19 which has large friction reducing effect such as nylon or the like is interposed between the ring 17 and the ring 18, and the ring 17 at the side of the rod 1 is contacted with the end 16 of the bearing section 15.

A flanged stationary ring is also mounted on the end portion 14 corresponding to the other end 20 of the bearing section 15 in the rod 1, but in the embodiment exemplified in the drawings, the stopper 13 is used to operate as the stationary ring.

To the side of the other end 20 of the bearing section 15 is engaged a metal ring 21. A synthetic resin ring 22 which has large friction reducing effect such as nylon or the like is engaged to the side of the stopper 13. A compressible cushion material ring 23 such as foamable polyurethane, rubber or spring washer is compressed and interposed between the ring 21 and the ring 22, and the stopper 13 as a stationary ring is contacted with the other end 20 of the bearing section 14 through the ring 22 and the ring 23.

In the arrangement thus constructed of this embodiment, the bearing section 15 is formed in a U shape in section opened upwardly as described above. Therefore, the elevational movements of the end portion 14 of the rod 1 in the directions designated by arrows E in FIG. 2 caused by the rocking movements of the link 3 in the directions designated by the arrows C and D are absorbed in the bearing section 15.

When the one end 16 of the bearing section 15 is contacted with the stationary ring 17 of the end portion 14 of the rod 1, movement of the rod 1 in the direction designated by the arrow A is prevented. When the other end 20 of the bearing section 15 is, on the other hand, contacted with the stopper 13 as the stationary ring of the end portion 14 of the rod 1, movement of the rod 1 in the direction designated by the arrow B is also prevented.

In the arrangement described above, the frictional resistance between the one end 16 and the other end 20 of the bearing section 15 and the stationary ring 17 of the end portion 14 of the rod 1 rotating relatively with respect to each other can be significantly reduced by the interposition of the synthetic resin rings 19 and 22 having a large friction reducing effect.

Further, the axial gap between the metal ring 21 and the ring 22 and the play between the movable element 6 and the threaded part 5 of the rod 1 due to the backlash can also be eliminated by the interposition of the cushion material ring 23 compressed between the ring 21 and the ring 22.

Figure 1:
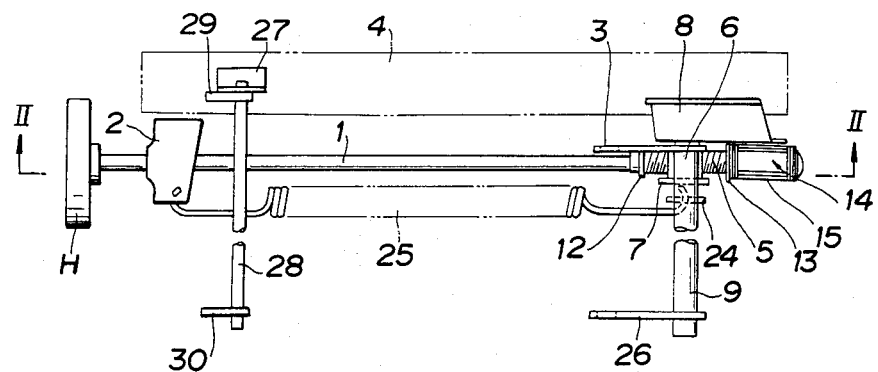
FIG. 1 is a plan view of the structure of the essential part of an embodiment of a device for adjusting the height of a seat cushion in the rear part of a seat according to the present invention.

In FIG. 1, a supporting bracket 24 is fixed to the shaft 9 at the element 6 side and hence in the vicinity of the lower side from the mounting position of the shaft 9. A spring 25 is extended between the front bracket 2 and the bracket 24, to thereby continuously impart a rotating moment to the link 3 in the direction designated by the arrow C. Consequently, the operating force of the handle H when the rear part of the seat cushion is raised can be reduced.

In the arrangement described above, a link 26 is further secured to the other end of the shaft 9 in the widthwise direction of the seat cushion in the same shape and disposition as the link 3, and is rotatably secured to the frame of the seat similarly to the link 3.

Figure 2:
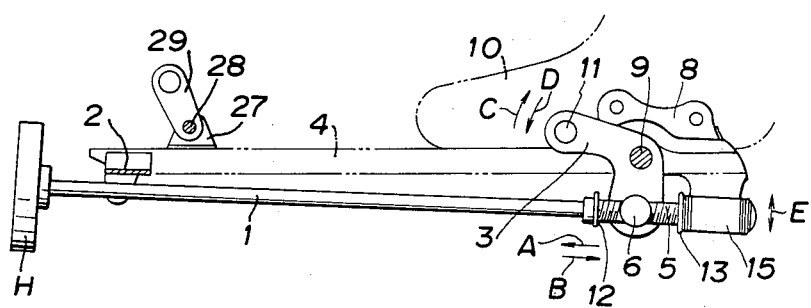
FIG. 2 is a sectional view of the device along the line II—II in FIG. 1.
Figure 3:
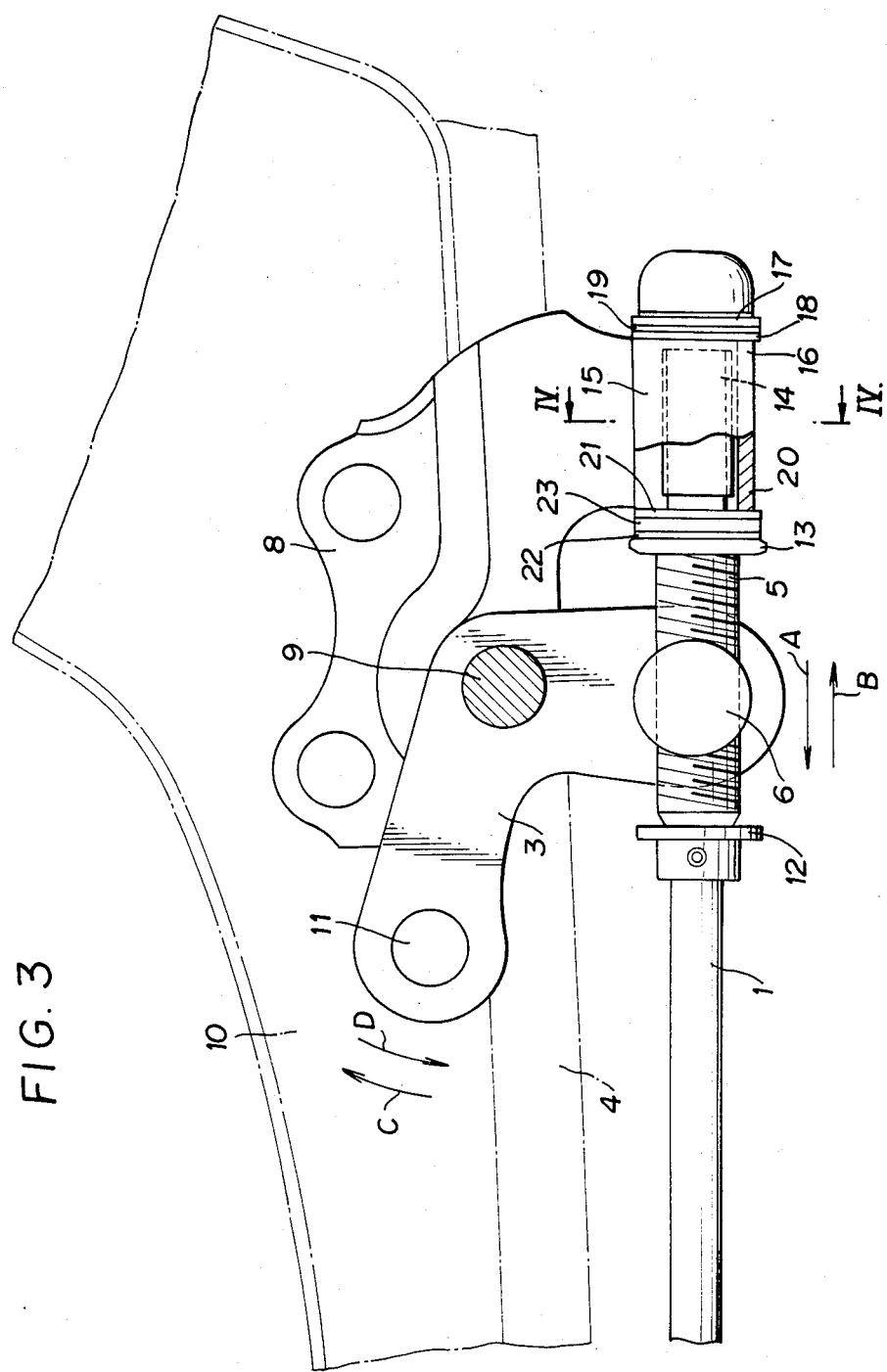
FIG. 3 is an enlarged side view of the essential part of the device of the invention.

In the arrangement shown in FIGS. 1 and 2, a bracket 27 is secured to the stationary member 4, a front shaft 28 is rotatably supported by the bracket 27, and links 29 and 30 are respectively rotatably secured to the front frame of the seat and the front shaft 28 for connecting the front part of the seat cushion to the side of stationary member 4.

It is noted that the ring 23 is not always disposed at the side of stopper 13 but may also be disposed at the side of stationary ring 17.

According to the present invention as described above with respect to the structure and the operation of the device for adjusting the height of the seat cushion in the rear part of the seat, the end portion of the rod for rotating the threaded part is contacted with the bearing section of the stationary member through the synthetic resin rings having a large friction reducing effect such as nylon or the like. Therefore, the frictional resistance between the bearing section and the end portion of the rod rotating relatively with respect to each other can be significantly reduced, and operability of the thread mechanism for adjusting the height of the rear part of the seat cushion steplessly can be remarkably improved. Further, in the arrangement described above, the cushion material ring is interposed between the end portion of the rod for rotating the threaded part and the bearing section for bearing the end portion of the rod, to thereby absorb and eliminate the axial gap or play between the rod and the threaded part. Consequently, the fluctuation of the seat cushion caused when an occupant sits on the seat cushion can be reduced, thereby improving the occupant's sittng feeling on the seat cushion.

Obviously, numerous modifications and variations of the present invention are possible in light of the above teachings. It is therefore to be understood that within the scope of the appended claims, the invention may be practiced otherwise than as specifically described herein.

What is claimed is:

1. A device for adjusting the height of a seat cushion in the rear part of a seat having a rotary handle attached to the seat, a threaded rod provided with the handle, and a stationary member secured with the seat substantially at the center, comprising:
   a movable element engaged with a threaded part of said rod;
   a link rockably mounted at said stationary member, pivotally secured at a first end thereof to said element and pivotally secured at a second end thereof to the rear part of said seat;
   a bearing section operatively associated with said stationary member for bearing an end portion of said rod;
   a first stationary ring mounted on a portion of said rod at the position corresponding to a first end of said bearing section;
   a first synthetic resin ring having large friction reducing effect interposed between and in contact with said first end of said bearing section and said stationary ring; and
   a second stationary ring mounted on a portion of said rod at a position corresponding to a second end of said bearing section;
   a second synthetic resin ring and a cushion material ring interposed in compressed manner between and in contact with a second end of said bearing section and said second stationary ring.

2. The device according to claim 1, wherein said bearing section is U shaped in section opened upwardly.

3. The device according to claim 1, wherein said first stationary ring further comprises a flange.

4. The device according to claim 1, wherein said synthetic resin further comprises nylon.

5. The device according to claim 1, wherein said second stationary ring further comprises a stopper.

6. The device according to claim 1, wherein said cushion material ring further comprises a foamable polyurethane ring.

7. The device according to claim 1, further comprising:
   a shaft rotatably secured to said stationary member; and
   a supporting bracket secured to said shaft at the position adjacent said movable element.

8. The device according to claim 7, further comprising:
a spring extended between said bracket and said stationary member for imparting a rotary moment to said link.

9. The device according to claim 7, further comprising:
a second link secured to said shaft and of the same shape and disposition as said first link.

10. A device for adjusting the height of a seat cushion in the rear part of a seat comprising:
a rotary handle disposed under the seat cushion in the front part of the seat,
a rod fastened at a first end thereof to said rotary handle and having a threaded part at a second end thereof,
a stationary member secured to a floor of an automobile and rotatably bearing a front part of said seat cushion,
a movable element engaged with said threaded part of said rod,
a link swingably mounted at said stationary member and having a first end thereof pivotally secured to said movable element and a second end thereof pivotally secured to the rear part of said seat cushion,
a bearing section operatively associated with said stationary member for bearing the second end of said rod,
a supporting member fixed to said stationary member for rotatably supporting said second end of said rod,
a first stationary ring mounted on a portion of said rod at a position corresponding to a rear end of said bearing section,
a first synthetic resin ring having large friction reducing effect interposed between and in contact with the rear end of said bearing section and said first stationary ring,
a second stationary ring mounted on said rod at a position corresponding to a front end of said bearing section, and
a second synthetic resin ring interposed between and in contact with the front end of said bearing section and said second stationary ring.

11. The device according to claim 10, further comprising;
a cushion material ring interposed in a compressed manner in contact between the front end of said bearing section and said second synthetic resin ring.

12. The device according to claim 10, further comprising;
a metal ring interposed in a compressed manner in contact between the rear end of said bearing section and said first synthetic resin ring.

13. A device for adjusting the height of a seat cushion in the rear part of a seat comprising;
a stationary member longitudinally located on a floor of an automobile,
a rod disposed under said stationary member and having a rotary handle fastened at one end thereof and a threaded part at the other end thereof,
a supporting member fixed to said stationary member for rotatably supporting a first end of said rod,
a bearing section positioned at said stationary member for bearing the other end of said rod,
a first link having a first end thereof rotatably mounted at the front part of said stationary member and a second end thereof rotatably mounted at the front part of said seat cushion,
a movable element engaged with the threaded part of said rod,
a second link swingably mounted at said stationary member and having a first end pivotablly secured to said movable element and a second end pivotally secured to the rear part of said cushion,
a first stationary ring mounted on the other end of said rod at the position corresponding to a rear end portion of said bearing section,
a first synthetic resin ring having large friction reducing effect interposed between and in contact with the rear end of said bearing section and said first stationary ring,
a second stationary ring mounted on the other end of said rod at the position corresponding to a front end portion of said bearing section, and
a second synthetic resin ring interposed between and in contact with the front end of said bearing section and said second stationary ring.

14. The device according to claim 13, further comprising;
a cushion material ring interposed in a compressed manner between and in contact with the front end of said bearing section and said second synthetic resin ring.

15. The device according to claim 13, further comprising:
a metal ring interposed in a compressed manner between and in contact with the rear end of said bearing section and said first synthetic resin ring.

16. The device according to claim 14, wherein said second stationary ring is further comprises stopper.

17. A device according to claim 1, wherein said cushion material ring further comprises a rubber ring.

18. A device according to claim 1, wherein said cushion material further comprises a spring washer.

* * * * *